United States Patent [19]

Greenberg

[11] 3,734,985
[45] May 22, 1973

[54] GLASS FIBER REINFORCED THERMOPLASTIC CELLULAR PLASTICS

[76] Inventor: Walter H. Greenberg, 220 Miller Road, Syossett, N.Y. 11801

[22] Filed: Apr. 13, 1970

[21] Appl. No.: 28,087

[52] U.S. Cl. ............... 264/45, 264/123, 264/328, 264/329, 264/DIG. 17, 264/DIG. 53
[51] Int. Cl. .............................................. B29d 27/00
[58] Field of Search ............ 264/123, 328, 45, 264/143, DIG. 17, 135, 329, DIG. 53; 260/2.5 AR; 28/12 N, 13 P; 18/3 Q, 3 P

[56] References Cited

UNITED STATES PATENTS

| | | | |
|---|---|---|---|
| 3,164,563 | 1/1965 | Maxwell | 264/143 X |
| 3,200,023 | 8/1965 | Cilker | 264/328 |
| 3,453,356 | 7/1969 | Kent | 264/143 |
| 3,382,302 | 5/1968 | Marzocchi | 264/45 |
| 3,084,973 | 4/1963 | Beckley | 264/45 X |
| 2,855,021 | 10/1958 | Hoppe | 264/45 X |
| 3,339,240 | 9/1967 | Corbett | 18/13 P X |
| 3,531,553 | 9/1970 | Bodkins | 264/328 X |
| 3,436,446 | 4/1969 | Angell | 264/328 X |
| 2,979,431 | 4/1961 | Perrault | 264/135 X |
| 3,378,612 | 4/1968 | Dietz | 264/328 X |
| 3,561,047 | 2/1971 | McInnis | 264/329 X |

*Primary Examiner*—Donald J. Arnold
*Assistant Examiner*—Paul A. Leipold
*Attorney*—John R. Ewbank

[57] ABSTRACT

Glass fibers are coated with uncured thermosetting resin selected from the group consisting of glycerol triacrylate, urea-formaldehyde and phenol-formaldehyde of the type designated as B stage. About 5 percent by weight of the coated fibers, while cool, are introduced into a mixture of gas and molten thermoplastic material selected from the group consisting of polypropylene nylon and polystyene shortly (i.e. less than a minute) prior to entry into the mold of low pressure injection molding apparatus. The heat of the molten thermoplastic material brings about a curing of the thermosetting coating on the glass fibers, but such curing is so slow that it becomes effective at about the same time as the thermoplastic material cools and solidifies in the mold. The product, a thermoplastic structural foam having short fibers of thermoset-coated glass fibers distributed throughout, has greater stiffness and greater tensile strength than conventional structural foam.

1 Claim, No Drawings

GLASS FIBER REINFORCED THERMOPLASTIC CELLULAR PLASTICS

BACKGROUND OF INVENTION

Heretofore various procedures have been proposed for preparing articles by casting or injecting molten compositions into molds for cooling into solid articles. Conventional plastic materials are injected under pressure such as 10,000 pounds per square inch, thus requiring large clamping pressures for the mold. Lower clamping pressures are achieved by lowering the viscosity of the molten plastic composition by distributing a large number of tiny gas cells therein. Structural foam is a term applied to products resulting from low pressure injection molding. The mold is filled with the mixture of molten plastic and gas within a brief period, usually less than a minute, and is cooled rapidly to provide an article sufficiently solid to be handled. The combination of the thermoplastic material and the gas cells has generally provided an article having significant resiliency and relatively low tensile strength. In production of some small solid thermoplastic articles, it has been feasible to employ pellets of a mixture of resin and glass fibers. However, in apparatus in which gas is dispersed into molten plastic in an extruder, the glass fibers cause troublesome abrasion of the extruder and the fibers are significantly pulverized in the extruder.

DESCRIPTION OF PREFERRED EMBODIMENTS

Thermoset plastics generally have cross-linking potentialities for growth in at least three dimensions, as distinguished from the predominantly two dimensional growth of polymers for thermoplastic materials. The curing of the thermosetting resin involves sufficient growth of the polymer in three dimensions that the structure is not thereafter readily plasticized by heat. Some of the thermally induced reactions effective for curing the thermoset resins are also effective in chemically bonding to another material, such as a thermoplastic resin.

Glass fibers have been employed predominantly in the reinforcement of thermosetting resins such as epoxy resins. Chopped fibers providing short staples of glass fiber have been marketed for use in reinforcing plastics. Certain such glass fiber staples have been provided with thin coatings of plastic, so that in making epoxy products, epoxy-coated fibers could be employed to achieve more perfect bonding, and so that phenol-formaldehyde coated fibers could be employed when bonding to phenol-formaldehyde was desired. Glass fibers have been marketed having thermoplastic coatings for use in making thermoplastic articles.

In accordance with the invention, a thin coating of a B stage resin is applied to glass fibers, and short lengths (i.e. staples) of the coated glass fibers are dispersed as relatively cool fibers into a pre-formed mixture of gas and molten thermoplastic at a time less than one minute prior to the completion of the mold-filling operation. The cool fibers are not instantly cured. The temperature of the molten plastic is sufficient to initiate the curing of the B stage resin coated upon the glass fibers. The B stage resin is cured to a greater extent during the hardening and cooling of the plastic article, and in curing bonds more securely to the thermoplastic structural foam surrounding each fiber.

EXAMPLE 1

Polypropylene is plasticized and melted to provide a low viscosity stream, into which nitrogen is intimately mixed to provide a stream having a lower viscosity by reason of the large number of small gas cells uniformly distributed in the stream. The mixture flows into an accumulating zone adapted to determine the shot size for the low pressure injection step and mechanical mixers agitate the contents of the accumulating zone. After the desired amount of mixture of molten polypropylene and nitrogen has been pumped into the accumulating zone, a controlled quantity of glass fiber staples coated with a B stage thermosetting resin derived from glycerol triacrylate is injected into the molten plastic and distributed therethrough by the mechanical mixers. The weight of glass fibers (excluding the coating) is about 5 percent of the weight of the polypropylene batch. Within about 30 seconds after the introduction of the glass fibers, the mixture is released for flow into the mold, so that the mold is filled with the mixture within less than a minute after the introduction of the glass fibers. The temperature of the molten polypropylene is sufficient to initiate the curing of the B stage resin, but the polypropylene starts cooling in the mold before the completion of the curing of the B stage resin. Further cooling leads to the production of an article having the glass fibers distributed throughout the structural foam. The article is a reel upon which cord is wound, and is a structural foam replacement for a wooden reel. The tensile strength of the article is greater than an unreinforced product. The reel has significantly greater stiffness, and it is significantly more difficult to temporarily deform the surface of the article than to deform an unreinforced article or an article containing the same amount of glass fibers having a thermoplastic polypropylene coating. By a series of tests, it is established that the degree of stiffenning of the article is about 50 percent greater for the B stage resin coated fibers, so that about 7½ percent polypropylene coated fibers are approximately equivalent to about 5 percent of the B stage resin coated fibers. The article is removed from the mold and is found to be effective as a reel upon which cord can be wound. By reason of having a greater stiffness than the corresponding unreinforced article, it is more competitive with wooden reels. The thickness of sections necessary for achieving a desired stiffness can be engineered to be less when using the glass reinforcement method of the present invention than when using unreinforced compositions. The reel has a combination of properties making it attractive for use wherever light weight reels are suitable.

EXAMPLE 2

A large diameter gear for the transmission of hand power at low speeds is made from structural plastic (moderate density foam) using unreinforced nylon in the low pressure injection molding. Although said nylon foam gear is suitable for some situations, it lacks the ruggedness and light weight desired for some gears. A product having about 7½ percent glass fibers, each glass fiber being coated with nylon miscible with the structural foam, provides a gear having acceptable properties. Glass fibers coated with B stage ureaformaldehyde resin are shown to be particularly effective, permitting the use of only about 5 percent by weight of the nylon for achieving the stiffness and ruggedness desired. Nylon pellets are melted and the molten nylon is admixed with superatmospheric carbon dioxide to provide a pressurized composition which at atmospheric pressure would constitute about 30 percent by volume nylon and about 70 percent by volume carbon dioxide. A stream of the compressed mixture is advanced toward an accumulating zone and through a mixing zone, in which relatively cool glass fibers are injected and dispersed by the action of mechanical mixing blades, the flow rates providing about 5 percent by weight of glass fiber per 95 percent by weight of nylon. Particular attention is directed to the fact that the glass fiber staples are coated with a B stage resin derived from urea-formaldehyde. The elevated temperature of the molten nylon initiates the curing of the B stage resin. The time required for the filling of the accumulating zone and the subsequent filling of the mold with the shot necessary for molding the gear is less than one minute, whereby the finalization of the curing of the coating is after the filling of the mold, and while the nylon is cooling toward solidification into a structural foam gear.

EXAMPLE 3

Polystyrene is melted under pressure and admixed with compressed trifluorochloroethane. The mixture flows into the accumulating zone of a cylinder in which the incoming mixture displaces a piston until the controlled shot size has been accumulated. An alternative accumulator chamber receives the flow of the mixture while the principal accumulator is not receptive. Meanwhile the article prepared by a previous molding cycle is being removed from its mold, and a mold is being readied for injection. After the mold is ready to receive a shot, the mixture of polystyrene and trifluorochloromethane is released from the accumulating zone and pumped by the action of the piston toward the mold. Between the accumulating zone and the mold is a mixing zone through which the stream has turbulent flow, and in this mixing zone, a quantity of glass fibers is injected to provide proportions corresponding essentially to approximately 5 percent glass fibers and 95 percent polystyrene. Particular attention is directed to the fact that the glass fibers are coated with a B stage resin derived from phenol-formaldehyde. The heat of the polystyrene initiates the curing of the B stage resin, and tends to promote bonding reactions with the polystyrene. The mold shapes the composition into semi-cylindrical pipe insulations members having greater stiffness than unreinforced members.

Various modifications of the invention are possible, and the examples are merely illustrative of some of the ways in which B stage coated glass fibers can be dispersed in a molten plastic foam and cured by reason of the heat transferred to the fibers from the hot plastic foam, the time between the introduction of the fibers and the completion of the filling of the mold being less than 1 minute.

The invention claimed is:

1. In the method in which a mixture of molten thermoplastic material and gas fills a mold by low pressure injection molding, the improvement which consist of:

preparing a mixture consisting essentially of molten thermoplastic selected from the group consisting of polypropylene, nylon, and polystyrene, and gas selected from the group consisting of nitrogen, carbon dioxide, trifluorochloromethane, and mixtures thereof;

admixing, based upon the weight of thermoplastic, about 5 percent by weight of short staples of glass fibers having a coating of B-stage thermosetting resin in a relatively cool condition with said mixture of molten thermoplastic material and gas, the heat from the thermoplastic material both initiating and bringing about the completion of the reactions for curing the thermoset coating on said glass fibers, said B-stage thermosetting resin being selected from the group consisting of glycerol triacrylate, urea-formaldehyde, and phenol-formaldehyde; and transferring the mixture of glass fibers, thermoplastic material, and gas to said mold so that said mold is filled with gas-expanded composition within less than one minute subsequent to the admixing of the glass fibers with the thermoplastic material, said B-stage resin being cured and bonded to the thermoplastic material by the heat derived from the molten thermoplastic during the time period ending by the time the thermoplastic material has cooled to provide a cellular molded article at ambient temperature, said molded article having a stiffness and ruggedness approximately matching that of a molded article containing about 7½ percent glass fibers coated with the thermoplastic, such decrease in the amount of glass fibers being attributable to the thermoset coating on the glass fibers.

* * * * *